United States Patent
Iwahara et al.

(10) Patent No.: US 9,120,509 B2
(45) Date of Patent: Sep. 1, 2015

(54) HOLE PLUG

(71) Applicant: Daiwa Kasei Industry Co., Ltd., Aichi (JP)

(72) Inventors: Toshio Iwahara, Aichi (JP); Makoto Kato, Aichi (JP); Hirofumi Kataoka, Aichi (JP); Tetsuya Ogino, Aichi (JP)

(73) Assignee: DAIWA KASEI INDUSTRY CO., LTD., Aichi (JP)

( * ) Notice: Subject to any disclaimer, the term of this patent is extended or adjusted under 35 U.S.C. 154(b) by 0 days.

(21) Appl. No.: 14/244,854

(22) Filed: Apr. 3, 2014

(65) Prior Publication Data

US 2014/0311038 A1   Oct. 23, 2014

(30) Foreign Application Priority Data

Apr. 22, 2013 (JP) ................................. 2013-089112

(51) Int. Cl.
*B60R 13/07* (2006.01)
*B62D 25/24* (2006.01)

(52) U.S. Cl.
CPC ...................................... *B62D 25/24* (2013.01)

(58) Field of Classification Search
CPC ........................................................ B62D 25/24
USPC .............. 49/463, 466; 24/458; 220/792, 789, 220/787, 784, 801, 802, 804
See application file for complete search history.

(56) References Cited

U.S. PATENT DOCUMENTS

| | | | | |
|---|---|---|---|---|
| 4,363,420 A * | 12/1982 | Andrews | ........................ | 220/787 |
| 4,391,384 A * | 7/1983 | Moore et al. | ................ | 220/359.4 |
| 4,534,088 A * | 8/1985 | Ricke | ............................... | 24/295 |
| 4,588,104 A * | 5/1986 | Danico | ........................ | 220/326 |
| 4,588,105 A * | 5/1986 | Schmitz et al. | ................ | 220/787 |
| 4,646,932 A * | 3/1987 | Masler | ........................ | 220/789 |
| 4,761,319 A * | 8/1988 | Kraus et al. | ..................... | 428/99 |
| 4,801,040 A * | 1/1989 | Kraus | ............................ | 220/787 |
| 4,832,234 A * | 5/1989 | Peterson | ....................... | 220/787 |
| 4,885,121 A * | 12/1989 | Patel | ............................ | 264/255 |
| 4,938,378 A * | 7/1990 | Kraus | ............................ | 220/789 |
| 4,998,642 A * | 3/1991 | Kraus | ............................ | 220/782 |
| 5,069,357 A * | 12/1991 | Anderson | ..................... | 220/787 |
| 5,267,667 A * | 12/1993 | Cozzani | ........................ | 220/787 |
| 5,505,324 A * | 4/1996 | Danico | ........................ | 220/201 |
| 5,702,133 A * | 12/1997 | Pavur et al. | ..................... | 292/80 |
| 5,709,309 A * | 1/1998 | Gallagher et al. | ............ | 220/229 |
| 5,852,854 A * | 12/1998 | Pierrot et al. | ................... | 24/297 |

(Continued)

FOREIGN PATENT DOCUMENTS

JP    2005-061459    3/2005

OTHER PUBLICATIONS

English translation of JP 2005-061459 (published Mar. 10, 2005).

*Primary Examiner* — Katherine Mitchell
*Assistant Examiner* — Justin Rephann
(74) *Attorney, Agent, or Firm* — McClure, Qualey & Rodack, LLP

(57) ABSTRACT

A brim-like flexing portion flexes via an abutment to an outer peripheral surface around an installation hole of an installed member, and it sandwiches an outer peripheral portion around the installation hole together with the elastic pawl portion. In determining a set dimension of the brim-like flexing portion, a diameter dimension of a flexing base portion is set in a value between an outer diameter dimension of a reduced-diameter portion and a hole diameter dimension of the installation hole.

6 Claims, 5 Drawing Sheets

(56) References Cited

U.S. PATENT DOCUMENTS

| | | | |
|---|---|---|---|
| 5,873,623 A * | 2/1999 | Dunton et al. | 296/154 |
| 5,893,480 A * | 4/1999 | Dore et al. | 220/784 |
| 6,319,436 B1 * | 11/2001 | Jaeger et al. | 264/40.6 |
| 6,557,208 B2 * | 5/2003 | Huet | 16/2.1 |
| 7,347,655 B2 * | 3/2008 | Nagasawa et al. | 411/508 |
| 8,070,008 B2 * | 12/2011 | Janke | 220/233 |
| 2003/0052132 A1 * | 3/2003 | Hansel et al. | 220/802 |
| 2003/0094771 A1 * | 5/2003 | Stratman et al. | 277/628 |
| 2006/0091144 A1 * | 5/2006 | Siragusa | 220/789 |
| 2006/0186130 A1 * | 8/2006 | Jatzke et al. | 220/789 |
| 2007/0062962 A1 * | 3/2007 | Iwahara | 220/796 |
| 2008/0142517 A1 * | 6/2008 | Nakazato | 220/201 |
| 2011/0005141 A1 * | 1/2011 | Leverger et al. | 49/463 |
| 2012/0297573 A1 * | 11/2012 | Iwahara et al. | 16/2.2 |

* cited by examiner

HOLE PLUG

RELATED APPLICATIONS

This application claims the priority of Japanese Patent Application No. 2013-089112 filed on Apr. 22, 2013. The disclosure of the prior application is hereby incorporated herein in the entirety by reference.

BACKGROUND OF THE INVENTION

1. Field of the Invention

The invention relates to a hole plug installed to an installed member having an installation hole by insertion to block the installation hole with its blocking surface portion.

2. Description of Related Art

Conventionally, an installed member such as a body panel of a vehicle (an automobile) etc. is formed of installation holes such as plug holes etc. The installation holes are used during assembling of the vehicle for various working. Some of the plug holes not used during operation etc. of the vehicle may be left unblocked, and allow foreign matters such as water, mud etc. to enter into a compartment therethrough. To prevent such entry of the foreign matters, a hole plug which blocks the installation hole with its blocking surface portion has been proposed for example, in Patent Document 1. Such hole plug comprises a flexible brim-like flexing portion formed along an outer periphery of the blocking surface portion to block the installation hole. With the hole plug installed to the installed member having the installation hole, the brim-like flexing portion flexes by an abutment with an outer or upper peripheral surface around the installation hole, so that an intimate contacting force due to abutment, i.e., an abutment intimate contacting force is generated between the brim-like flexing portion and the outer peripheral surface around the installation hole. Thus, a sealing function is rendered therebetween.

Meanwhile, for the brim-like flexing portion a degree of length is required to be set as a dimension from its outer periphery (annular outer edge) to a flexing base portion forming an annular boundary line portion of the brim-like flexing portion from the blocking surface portion. Such length allows the brim-like flexing portion to bend via abutment with the outer peripheral surface around the installation hole, that is, the brim-like flexing portion generates the abutment intimate contacting force via abutment with the outer peripheral surface around the installation hole. Whereas, a standing wall etc. may be formed in the installed member by bending an area near the installation hole, which shortens a distance between a bent portion and the installation hole. In such a case, with the hole plug installed to the installed member in the installation hole, the annular outer edge of the brim-like flexing portion may partially interfere with a round corner part of the bent portion. Consequently, suitable abutment intimate contacting force is hardly generated between the brim-like flexing portion and the outer peripheral surface around the installation hole.

RELATED ART DOCUMENTS

[Patent Document 1] Japanese Laid-Open Patent Publication No. 2005-61459

SUMMARY OF THE INVENTION

The subject to be solved by the invention is to provide a hole plug configured to generate the abutment intimate contacting force, between the hole plug and the outer peripheral surface around the installation hole of the installed member, even when the bent portion is formed on the installed member in the area near the installation hole.

In order to solve the above subject matter or the disadvantage, a hole plug according to this invention comprises;

at least one fit side wall portion (i) that is erected on a rear surface of a blocking surface portion of a hole plug installed to an installed member in an installation hole to block the installation hole, and (ii) that has an outer diameter dimension set substantially equal to a hole diameter dimension of the installation hole to be engaged therein;

at least one elastic pawl portion (i) that is protruded from the fit side wall portion, and (ii) that (a) elastically deforms in a direction to come near to an installation axis of the hole plug by being pressed with an inner peripheral surface of the installation hole during insertion thereinto, while (b) causes the hole plug to engage with the installation hole upon insertion to a position beyond the installation hole via its elastic restoring in a direction to distant from the installation axis of the hole plug;

a brim-like flexing portion (i) that is provided along an outer periphery of the blocking surface portion to have a brim-like shape and to be flexible, and (ii) that flexes via an abutment to an outer peripheral surface around the installation hole in an installed state of the hole plug into the installation hole, the flexure urging the hole plug in a direction to be pulled out from the installation hole such that the brim-like flexing portion sandwiches an outer peripheral portion around the installation hole together with the elastic pawl portion therebetween; and a reduced-diameter portion (i) that is provided on a base portion where the fit side wall portion is erected from the blocking surface portion, and (ii) that has a smaller diameter than a hole diameter dimension of the installation hole, wherein an outer diameter dimension of the brim-like flexing portion is set in a value larger than the hole diameter dimension of the installation hole, and a diameter dimension of a flexing base portion which forms a boundary line portion from the blocking surface portion is set in a value larger than an outer diameter dimension of the reduced-diameter portion and smaller than the hole diameter dimension of the installation hole.

A brim-like flexing portion flexes via an abutment to an outer peripheral surface around an installation hole of an installed member and sandwiches an outer peripheral portion around the installation hole together with the elastic pawl portion. In determining a set dimension of the brim-like flexing portion, a diameter dimension of a flexing base portion is set in the value larger than the outer diameter dimension of the reduced-diameter portion and smaller than the hole diameter dimension of the installation hole. Thus, a length dimension (a dimension from the annular outer edge to the flexing base portion) of the brim-like flexing portion can be rendered, which is necessary for generating a suitable abutment intimate contacting force with the upper peripheral surface around the installation hole. In addition to such length dimension, a length dimension can be shortened which extends from the outer wall of the fit side wall portion, i.e., the outer periphery of the installation hole to the annular top edge of the brim-like flexing portion. Consequently, even if the standing wall etc. formed by bending the area near the installation hole shortens distance between the bent portion and the installation hole, the annular outer edge of the brim-like flexing portion is prevented from interfering with the round corner parts of the bent portions, with the hole plug installed to the installed member at the installation hole. Thus, the hole plug can be installed into the installation hole with the suitable abutment intimate contacting force generated between the brim-like flexing portion and the outer peripheral surface around the installation hole. That is, forming the reduced-diameter portion having the smaller outer diameter on the base portion of the fit side wall portion enables the flexing base portion of the brim-like flexing portion to be set at more radially inward position accordingly. This can secure the necessary length dimension of the brim-like flexing portion for suitable flexion while the outer diameter dimension is set in the smaller value. Meanwhile, the necessary length dimension thus secured makes the brim-like flexing portion more flexible, which suppress a reaction force applied to the hole plug from the installed member. As a result, the hole plug can be inserted by the lowered inserting load with generating the suitable abutment intimate contacting force.

DESCRIPTION OF THE EMBODIMENTS

Figure 1:
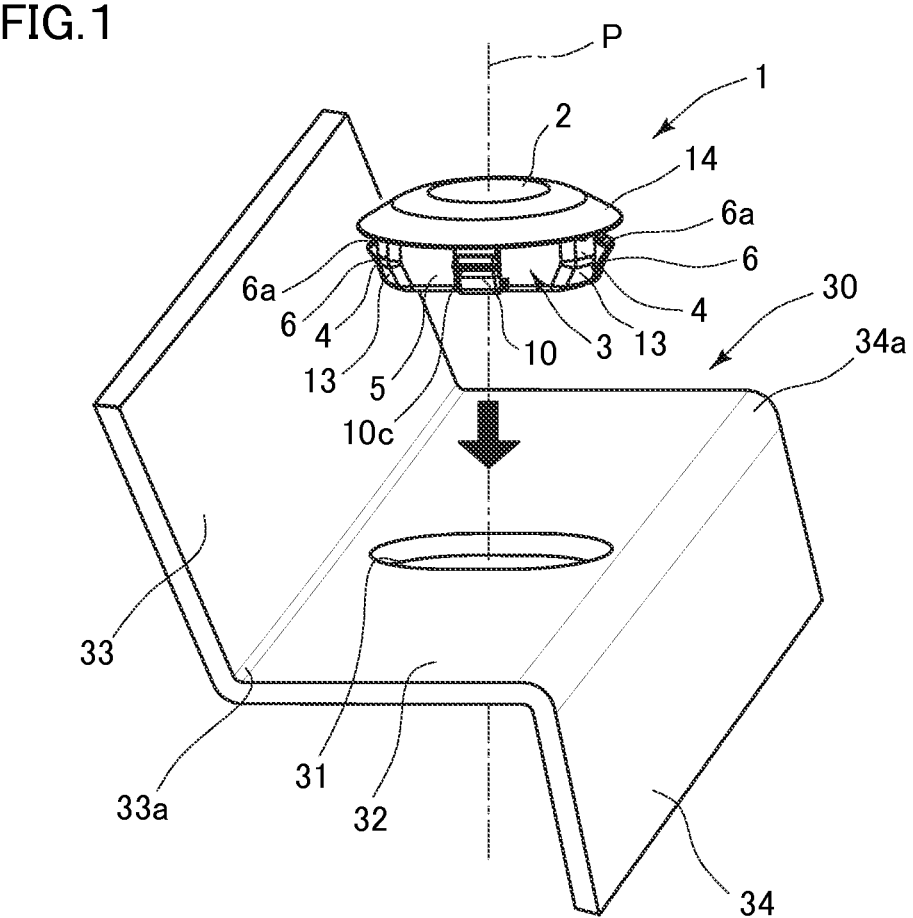
FIG. 1 is a perspective view showing a hole plug according to the invention, and a body panel to which the hole plug is installed.
Figure 2:
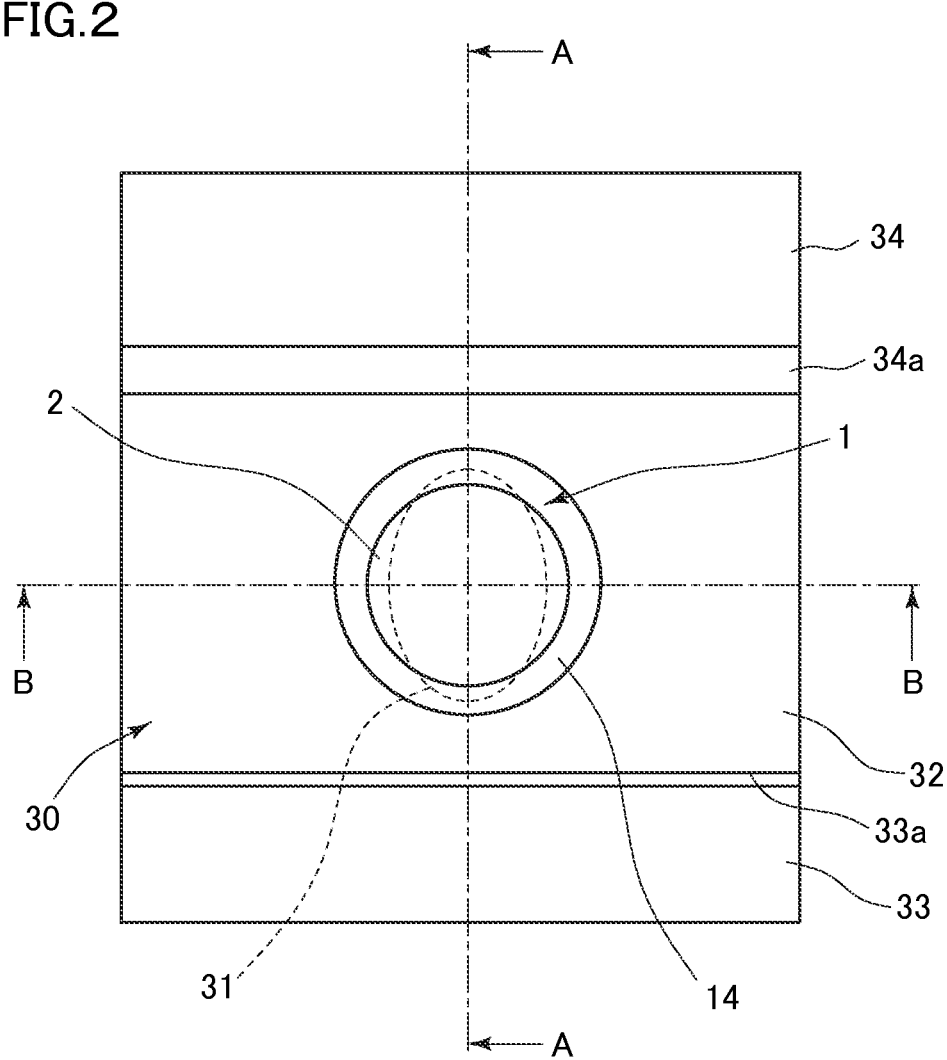
FIG. 2 is a plan view showing the body panel with the hole plug installed.

In the following, one embodiment of the invention will be explained with reference to attached drawings. As shown in FIGS. 1 and 2, a hole plug 1 is installed to a body panel 30 as an installed member in or at an installation or insertion hole 31. The body panel 30 is made from a plate-like member by bending, and it is formed of an installation hole 31 by perforating. In this embodiment, the installation hole 31 is formed as an elliptic hole. The body panel 30 constitutes for example an outer plate of an automobile. The installation hole 31 perforated on the outer plate is used as a working hole, and becomes unnecessary when the automobile is operated after the assembling work has been completed. For this reason, the hole plug 1 is installed to or inserted into the installation hole 31 of the body panel 30 to block it. Here, the hole plug 1 has a water-proof function which prevents a flow of water in both directions between an outside and an inside of the body panel 30 for blocking the installation hole 31.

Figure 3:
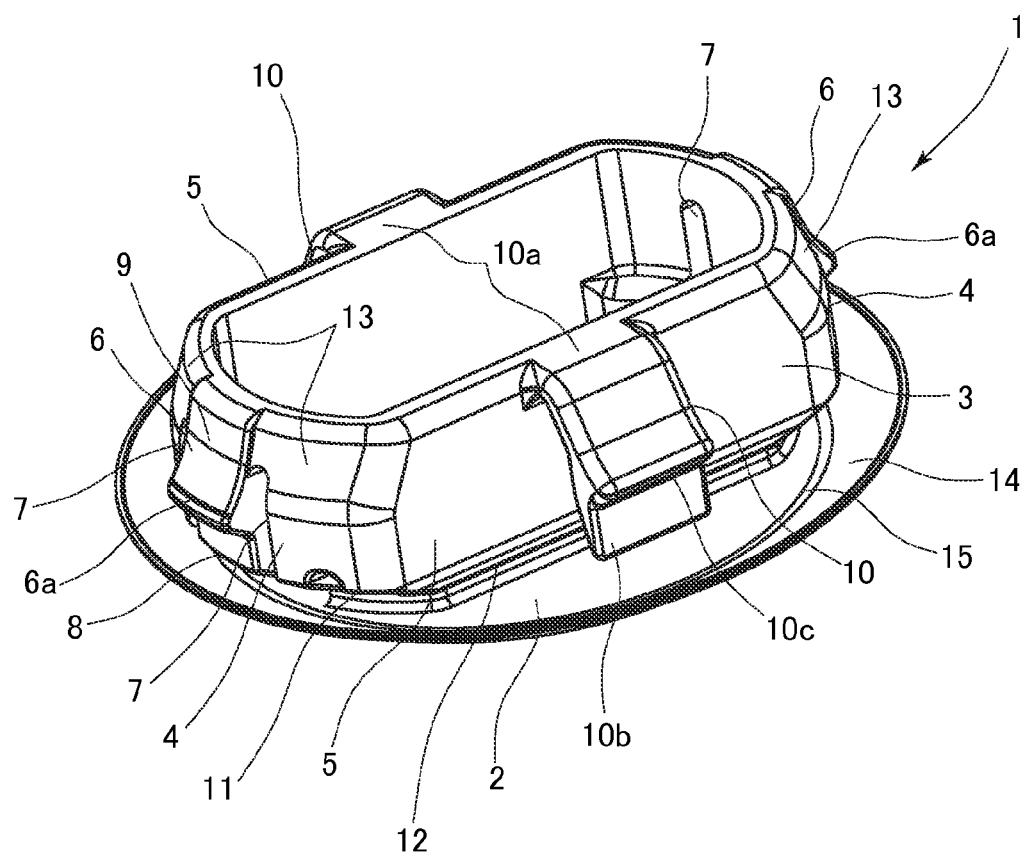
FIG. 3 is a perspective view showing the hole plug.

The hole plug 1 integrally made of rigid resin material has a blocking surface portion 2 of perfect circular, as shown in FIG. 3, to block the installation hole 31, and a cylindrical inserting portion 3 cylindrically erected on a rear surface of the blocking surface portion 2 for insertion into the installation hole 31. The cylindrical inserting portion 3 cylindrically formed has an oval shape (track-race shape, ellipse shape) in a plan view from an underside (a side opposite to the blocking surface portion 2) of the hole plug 1 to correspond to the installation hole 31 of elliptic shape.

Figure 4:
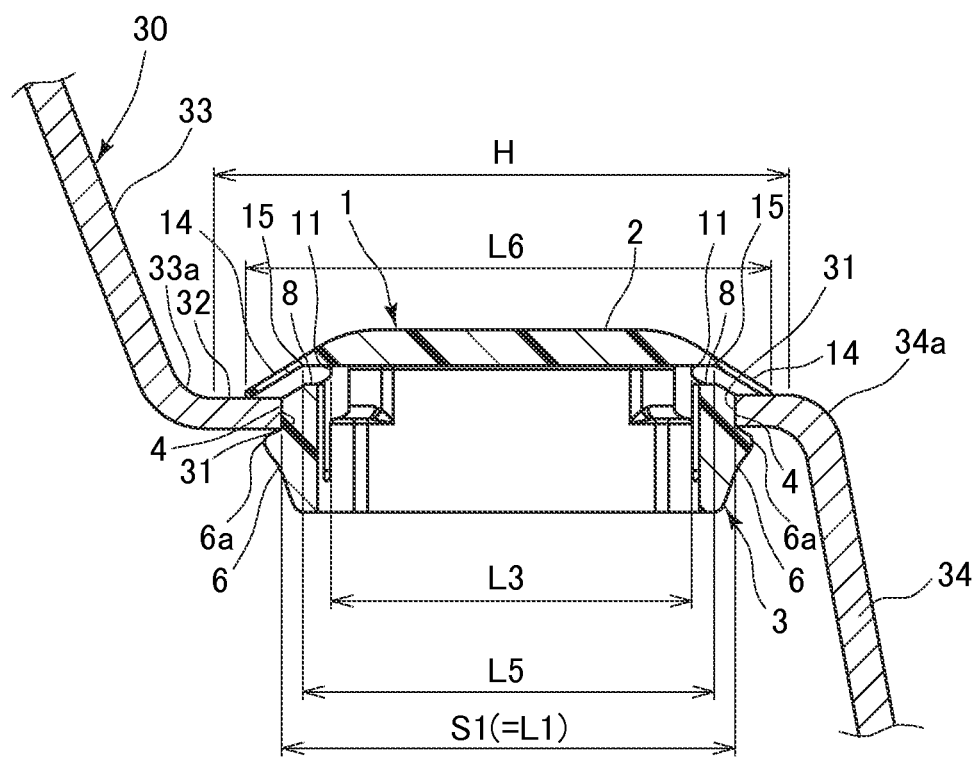
FIG. 4 a sectional view taken along a line A-A in FIG. 2.
Figure 5:
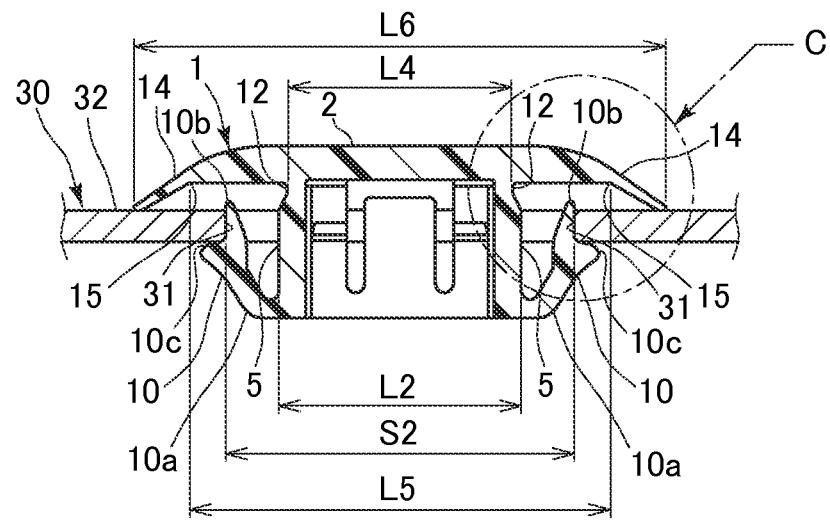
FIG. 5 a sectional view taken along a line B-B in FIG. 2.

The cylindrical inserting portion 3 of oval shape in the plan view has, at its longitudinally both ends, side walls which constitute a pair of fit side wall portions 4 for insertion into the installation hole 31. The pair of fit side wall portions 4 are formed into arc shapes corresponding to arc parts around the installation hole 31 at both ends in the long axis direction. As shown in FIG. 4, the pair of fit side wall portions 4 have an outer diameter dimension L1 set in a value equal to a hole diameter dimension of the installation hole 31 in the long axis direction, i.e. larger diameter dimension S1. On the other hand, the cylindrical inserting portion 3 has, at its both ends in a direction orthogonal to the longitudinal direction, side walls which constitute a pair of insertion side wall portions 5 for insertion into the installation hole 31. As shown in FIG. 5, the pair of insertion side wall portions 5 are formed in parallel with a predetermined interval L2 between outer wall (hereinafter, this is also referred to as "an outer diameter dimension L2 between insertion side wall portions 5") which is smaller than a hole diameter dimension of the installation hole 31 in the short axis direction, i.e. smaller diameter dimension S2.

Each of the fit side wall portions 4 is formed of an elastic pawl portion 6. The elastic pawl portion 6 is formed by cutting out the fit side wall portion 4 along a pair of first slits 7 and a second slit 8. Each of the first slits 7 extends on the fit side wall portion 4 from its base or proximal portion (an erected portion from a rear surface of the blocking surface portion 2) in a direction along an installation axis P of the hole plug 1 (refer to FIG. 1) by a predetermined length. The second slit 8 extends on the base portion in a direction orthogonal to the installation axis P. The elastic pawl portion 6 achieves an elastic deformation about a connected portion (a fulcrum 9) with the fit side wall portion 4 to come near or to distance from relative to the installation axis P. Each of the elastic pawl portions 6 is formed of, on its outer wall, an engaging protrusion 6a which protrudes more outwardly than the fit side wall portion 4 to engage with an outer peripheral surface around the installation hole 31. In this way, the fit side wall portions 4, arranged in a left-right symmetrical relation with respect to the installation axis P, are provided with the elastic pawl portions 6 each having the engaging protrusion 6a.

Each of the insertion side wall portions 5 is formed of an elastic tongue piece 10. The elastic tongue piece 10 includes a base or proximal portion 10a formed by a distal end portion (a portion opposite to the blocking surface portion 2) of the insertion side wall portions 5, and a free or distal end 10b extending from the base portion 10a. The free end 10b distances from an outer wall of the insertion side wall portion 5 as it goes near the blocking surface portion 2. A cantilever-like supporting of the base portion 10a allows the free end 10b of the elastic tongue piece 10 to deform elastically, so that the free end 10b comes near/distances from relative to the outer wall of the insertion side wall portion 5 about the base portion 10a as a fulcrum. Each of the elastic tongue pieces 10 is formed of, on its outer wall, an engaging protrusion 10c which allows the hole plug 1 to engage with an outer peripheral surface around the installation hole 31, likewise the elastic pawl portion 6a formed on the elastic pawl portion 6. In this way, the insertion side wall portions 5, arranged in a left-right symmetrical relation relative to the installation axis P, are provided with the elastic tongue pieces 10 each having the engaging portion 10c.

The fit side wall portions 4 and the insertion side wall portions 5 constitute a cylindrical inserting portion 3. The cylindrical inserting portion 3 is erected from an annular side wall portion of the blocking surface portion 2. The annular side wall portion is recessed radially inwardly toward the installation axis P over entire circumferential periphery of the oval shape in the plan view. That is, the fit side wall portions 4 are formed of, at the base portions, a reduced-diameter portions 11 which have a diameter smaller than the outer diameter dimension L1 of the fit side wall portions 4. The insertion side wall portions 5 are formed of, at the base portions, a reduced-diameter portion 12 which have a diameter smaller than the outer diameter dimension L2 between the insertion side wall portions 5. The reduced-diameter portions 11 are set in an outer diameter dimension L3 which is smaller than the outer diameter dimension L1 of the fit side wall portions 4 (refer to FIG. 4), and the reduced-diameter portions 12 are set in an outer diameter dimension L4 which is smaller than the outer diameter dimension L2 between the insertion side wall portions 5 (refer to FIG. 5). On an outer wall at a distal portion (a portion opposite to the base or proximal portion) of the fit side wall portion 4, a tapering sloped surface portion 13 is formed which reduces in the outer diameter as it goes toward its distal portion. The sloped surface portion 13, making the distal portion of the cylindrical inserting portion 3 into a tapered shape, facilitates an inserting manipulation of the cylindrical inserting portion 3 into installation hole 31, i.e., an installing manipulation of the hole plug 1.

The blocking surface portion 2 is formed into a dome shape (a perfect circle in the plan view) so as to cover the elliptic installation hole 31. The blocking surface portion 2 is integrally provided with, along its outer periphery, a brim-like flexing portion 14 which is annular in shape and flexible in its thickness direction. The brim-like flexing portion 14 is sloped downwardly toward the body panel 30 as it goes radially outwardly (annular outer edge). When the hole plug 1 is installed to the body pane 30 having the installation hole 31, the brim-like flexing portion 14 flexes via an abutment with an outer peripheral surface around the installation hole 31, which urges the hole plug 1 in a direction to be pulled out from the installation hole 31. Thus, the brim-like flexing portion 14 sandwiches the body panel 30 at the outer peripheral portion around the installation hole 31, together with the elastic pawl portion 6 of the fit side wall portion 4 and the elastic tongue pieces 10 of the insertion side wall portion 5.

Figure 6:
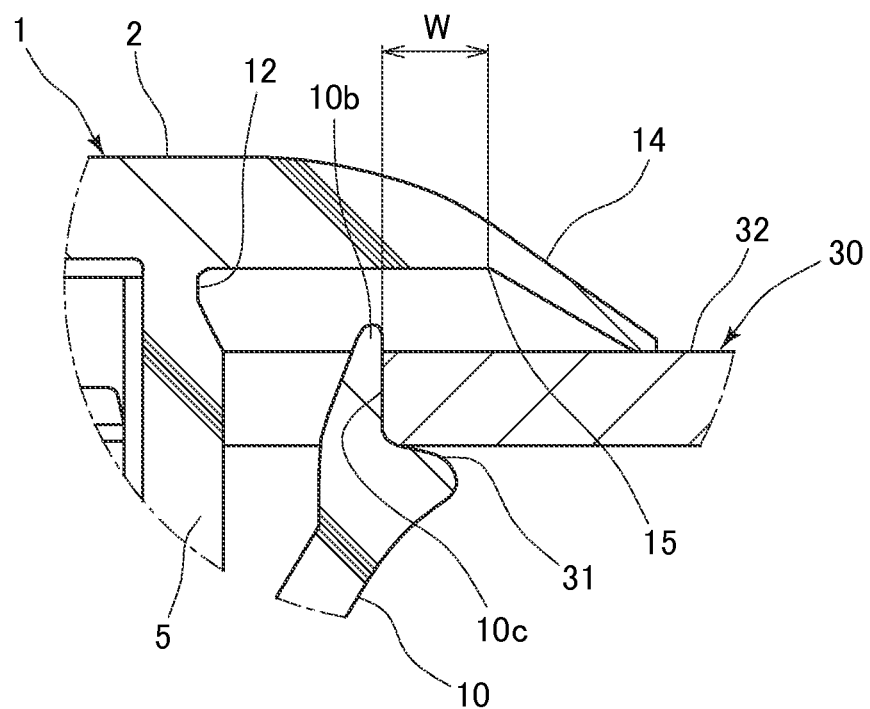
FIG. 6 is an enlarged view of a C-part in FIG. 5.

A boundary line of the brim-like flexing portion 14 from the blocking surface portion 2, that is the annular outer periphery of the blocking surface portion 2, corresponds to or coincides with a flexing base or proximal portion 15 of perfect circular. As shown in FIG. 5, the flexing base portion 15 is set in a diameter dimension L5 larger than a smaller diameter dimension S2 of the elliptic installation hole 31. Consequently, in the minor axis direction of the installation hole 31, a part(s) of the flexing base portion 15 extend radially outwardly beyond the outer periphery around the installation hole 31 by a predetermined length W (=(L5−S2)/2), resting on a part(s) of the outer peripheral surface around the installation hole 31 as shown in FIG. 6. Thus, the part of the outer peripheral surface having the smaller diameter dimension S2 are sufficiently covered by the blocking surface portion 2.

To the contrary, in the major axis direction of the installation hole 31, as shown in FIG. 4, the diameter dimension L5 of the flexing base portion 15 is set to be smaller than the larger diameter dimension S1 of the installation hole 31, i.e., the outer diameter dimension L1 of the fit side wall portion 4. Consequently, any part(s) of the outer peripheral surface around the installation hole 31 having the larger diameter dimension S1, is not sufficiently covered by the blocking surface portion 2, but is instead covered by a part (s) of the brim-like flexing portion 14 formed extending from the outer periphery of the blocking surface portion 2. Here, the brim-like flexing portion 14 extends radially outwardly from the entire outer periphery of the blocking surface portion 2 of perfect circular by a predetermined extended length. Thus, the brim-like flexing portion 14 has an outer periphery of perfect circular, likewise the outer periphery of the blocking surface portion 2. An outer diameter dimension L6 of the brim-like flexing portion 14 is set in a value larger than the larger diameter dimension S1 of the installation hole 31.

Next, an installed state of the hole plug 1 to the body panel 30 will be explained. Firstly explained is the body panel 30 to which the hole plug 1 is installed. As shown in FIG. 1 and FIG. 2, the body panel 30 comprises a horizontal surface 32, an ascending wall surface 33 and a descending wall surface 34. The horizontal surface 32 is perforated of the installation hole 31 and contributes as an installing surface for the hole plug 1. The ascending wall surface 33 is formed by bending the horizontal surface 32 upwardly along a line located near one part in the major axis direction around the installation hole 31. The descending wall surface 34 is formed by bending the horizontal surface 32 downwardly along a line located near other part in the major axis direction around the installation hole 31. A bent portion formed between the horizontal surface 32 and the ascending wall surface 33 has a bent round portion 33a which bends or faces upwardly. A bent portion formed between the horizontal surface 32 and the descending wall surface 34 has a bent round portion 34a which bends or faces downwardly. In this way, the bent round portions 33a and 34a are formed on the horizontal surface 32 near one part and other part in the major axis direction around the installation hole 31.

When the hole plug 1 is installed to the body panel 30, the cylindrical wall portion 3 is inserted into the installation hole 31 along the installation axis P in a state, with the pair of fit side wall portions 4 coinciding with the major axis of the installation hole 31, and the pair of insertion side wall portions 5 coinciding with the minor axis of the installation hole 31. Upon insertion, the elastic pawl portions 6 provided on the fit side wall portions 4 elastically deform radially inwardly toward the installation axis P by being pressed with the inner peripheral surface at the both ends in the long axis direction around the installation hole 31. When axially inserted down to a depth or position beyond the installation hole 31, the elastic pawl portions 6 elastically restore radially outwardly away from the installation axis P. Thus, the elastic pawl portions 6 of the hole plug 1 engage with the outer peripheral surface around the installation hole 31. Likewise, the elastic tongue pieces 10 provided on the insertion side wall portions 5 elastically deform radially inwardly toward the installation axis P by being pressed with the inner peripheral surface at the both ends in the short axis direction around the installation hole 31. When axially inserted to the depth or position beyond the installation hole 31, the elastic tongue pieces 10 elastically restore radially outwardly away from the installation axis P. Thus, the elastic tongue pieces 10 of the hole plug 1 engage with the outer peripheral surface around the installation hole 31.

An operation of the brim-like flexing portion 14 will be explained in the engaged state of the hole plug 1 with the body panel 30 by the elastic pawl portions 6 and the fit side wall portions 4. As mentioned above, the brim-like flexing portion 14 is formed extending from the outer periphery of the blocking surface portion 2 which covers the installation hole 31. The brim-like flexing portion 14 flexes via abutment with the outer peripheral surface around the installation hole 31 (the horizontal surface 32 of the body panel 30). This urges the hole plug 1 in the direction to be pulled out from the installation hole 31, so that the outer peripheral surface (the horizontal surface 32) around the installation hole 31 is sandwiched between the brim-like flexing portion 14, and the elastic pawl portions 6 (engaging protrusions 6a) and the elastic tongue pieces 10 (engaging protrusions 10a). In this way, the hole plug 1 is installed to the body panel 30 by the engagement so as to cover the installation hole 31. In addition, under such state, due to the brim-like flexing portion 14 arranged to be suitably abutted against the outer surface of the body panel 30, the hole plug 1 blocks the installation hole 31 with its water-proof function which interrupts the flow of water in both direction between the outside and the inside of the body panel 30.

By the way, as the set dimensions for the brim-like flexing portion 14 to exhibit the above-mentioned water-proof function, the outer diameter dimension L6 of the brim-like flexing portion 14 and the diameter dimension L5 of the flexing base portion 15 are set as follows. The outer diameter dimension L6 is set in a value larger than the hole diameter dimension (larger diameter dimension S1) of the installation hole 31. In conjunction therewith, the diameter dimension L5 of the flexing base portion 15 forming the boundary line portion of the brim-like flexing portion 14 from the blocking surface portion 2 is set in a value between the outer diameter dimension L3 of the reduced-diameter portion 11 and the hole diameter dimension (larger diameter dimension S1) of the installation hole 31. In other words, reducing diameter of the base portion of the cylindrical inserting portion 3 (forming the reduced-diameter portion 11) enables the flexing base portion 15 of the brim-like flexing portion 14 to be positioned radially inside an inner periphery or edge around the installation hole 31.

Thus, a length dimension (a dimension from the annular outer edge to the flexing base portion 15 of the brim-like flexing portion 14, referred to as "flexing/flexure set dimension" hereinafter) of the brim-like flexing portion 14 can be rendered, which is necessary for generating a suitable abutment intimate contacting force with the outer peripheral surface around the installation hole 31. In addition to such length dimension, a length dimension can be shortened which extends from the outer wall of the fit side wall portion 4, i.e., the inner periphery of the installation hole 31 to the annular outer edge of the brim-like flexing portion 14. Consequently, even if the standing wall etc. formed by bending the area near the installation hole shortens distance between the bent portion and the installation hole, the annular outer edge of the brim-like flexing portion 14 is prevented from interfering with the round corner parts 33a, 34a of the bent portions, with the hole plug installed to the installed member at the installation hole. Thus, the hole plug 1 can be installed into the installation hole 31 with the suitable abutment intimate contacting force generated between the brim-like flexing portion 14 and the outer peripheral surface around the installation hole 31. For example, the above advantage can be obtained even in the case disclosed in the embodiment where the ascending wall surface 33 and the descending wall surface 34 of the body panel 30 are formed by bending the horizontal surface 32 at both sides of the installation hole 31 in the long axis direction. The round corner parts 33a, 34a forming the respective bent portions are located near the installation hole 31. Interference prevention of the brim-like flexing portion 14 with the round corner parts 33a, 34a enables the hole plug 1 to be installed into the installation hole 31 of the body panel 30, with the abutment intimate contacting force generated between the brim-like flexing portion 14 and the outer peripheral surface around the installation hole 31. In other words, with the brim-like flexing portion 14 having flexure set dimension, as shown in FIG. 4, the hole plug 1 can be installed, on the area of the horizontal surface 32 between the round corner part 33a and the round corner part 34a, within a settable area H. In the settable area H, the brim-like flexing portion 14 can generate the suitable abutment intimate contacting force to be applied to the outer peripheral surface (horizontal surface 32) around the installation hole 31.

The embodiment of the invention has been explained heretofore, but it is recognized that this embodiment is for illustration purpose only. The invention should not be limited to such embodiment, and various variations will occur without departing from a purport defined from claims enclosed. For example, in the above-mentioned embodiment, the diameter dimension L5 of the flexing base portion 15 forming the boundary line portion of the brim-like flexing portion 14 from the blocking surface portion 2 is set in the value between the outer diameter dimension L3 of the reduced-diameter portion 11 and the hole diameter dimension (larger diameter dimension S1) of the installation hole 31. However, the diameter dimension of the flexing base portion is sufficiently set in the value larger than the outer diameter dimension of the reduced-diameter portion, and smaller than the hole diameter dimension of the installation hole. Such dimensional setting can render the advantages of the invention likewise. Also, the outer diameter dimension L1 of the fit side wall portion 4 and the larger diameter dimension S1 of the installation hole 31, set in the same value in the embodiment, do not necessarily have the same value. Alternately, the outer diameter dimension L1 may be set in a value slightly smaller than the larger diameter dimension S1.

In the embodiment, the two fit side wall portions 4 are provided on the plug hole 1 at the left-right symmetrical positions with respect to the installation axis P. However, configuration of the fit side wall portions 4 provided on the hole plug 1 is not limited to one in the embodiment. Alternately, all of the side wall portions provided along the entire inner periphery around the installation hole may be fit side wall portions, for example. In addition, configuration of the elastic pawl portions provided on the fit side wall portion is not limited to two predetermined locations. Alternately, plural elastic pawl portions may be provided at plural locations (for example at four locations along the inner periphery with 90 degrees interval) along the entire inner periphery around the installation hole. In the embodiment, the installation hole 31 of elliptic shape is formed on the body panel 31, while cylindrical inserting portion 3 has the oval shape (track-race shape, ellipse shape) in the plan view, corresponding to the elliptic installation hole 31. However, configuration of the installation hole 31 of the body panel 30 as the installed member, and the cylindrical inserting portion 3 of the hole plug 1 are not limited to that disclosed in the above-mentioned embodiment. In addition to the elliptic (oval) shape disclosed in the embodiment, the installation hole formed on the installed member may be of perfect circular, rectangular or polygonal.

What is claimed is:

1. A hole plug comprising:
a cylindrical inserting portion erected on a rear surface of a blocking surface portion of a hole plug installed in an installation hole to block the installation hole;
the cylindrical inserting portion having, at longitudinal ends thereof, side walls constituting a pair of fit side wall portions formed into arc shapes, each of the arc shapes having an outer diameter dimension corresponding to a hole diameter dimension of the installation hole, and
the cylindrical inserting portion having, at transverse ends thereof, side walls constituting a pair of insertion side wall portions formed in parallel to each other and spaced from each other at a predetermined interval;
each of the fit side wall portions having an elastic pawl portion operative to form an interference fit with the installation hole such that in a deformation mode, each of the elastic pawl portions elastically deforms towards an installation axis of the hole plug responsive to being pressed with an inner peripheral surface of the installation hole during insertion thereinto, and in an engaging mode, each of the elastic pawl portions engages the installation hole upon insertion to a position beyond the installation hole via its elastic recovery away from the installation axis;

a flexing portion configured as an annular flange provided along an outer periphery of the blocking surface portion, the flexing portion deforming outwardly from the installation axis responsive to engagement with an outer peripheral surface around the installation hole in an installed state of the hole plug into the installation hole such that the outer peripheral portion is between the flexing portion and the elastic pawl portions; and base portions extending from the blocking surface portion and interconnecting respective ones of the fit side wall portions and the blocking surface portion, the base portion having a reduced-diameter portion with a smaller diameter than the outer diameter dimension at the fit side wall portions, wherein an outer diameter dimension of the flexing portion is larger than the hole diameter dimension of the installation hole, and a diameter dimension of a flexing base portion, which forms an annular transition between the flexing portion and the blocking surface portion, is larger than an outer diameter dimension of the reduced-diameter portion and smaller than the outer diameter dimension at the fit side wall portions.

2. The hole plug according to claim 1, wherein two elastic pawl portions are provided at least two locations on the fit side wall portion which are left-right symmetrical with respect to the installation axis.

3. The hole plug according to claim 2, wherein the insertion side wall portions are formed of, at the base portions, a reduced-diameter portion which has a diameter smaller than the outer diameter dimension between the insertion side wall portions and become continuous with the reduced-diameter portion of the fit side wall portions.

4. The hole plug according to claim 1, wherein the installation hole is elliptical having a major axis and a minor axis, and the outer diameter dimension between the fit side wall portions corresponds to the major axis of the installation hole.

5. The hole plug according to claim 1, wherein the cylindrical inserting portion has an oval shape.

6. The hole plug according to claim 1, wherein the installation hole has a circular shape.

* * * * *